United States Patent [19]

Matsuki

[11] Patent Number: 5,388,780
[45] Date of Patent: Feb. 14, 1995

[54] SEAT BELT RETRACTOR

[75] Inventor: Masuo Matsuki, Kanagawa, Japan

[73] Assignee: NSK Ltd., Tokyo, Japan

[21] Appl. No.: 100,141

[22] Filed: Aug. 2, 1993

[30] Foreign Application Priority Data

Aug. 5, 1992 [JP] Japan .............................. 4-060561[U]

[51] Int. Cl.⁶ .......................................... B65H 75/48
[52] U.S. Cl. .................................................. 242/384
[58] Field of Search ......... 242/107, 107.4 R, 107.4 A, 242/107.4 B, 384; 280/801 A, 806, 807

[56] References Cited

U.S. PATENT DOCUMENTS

| | | | |
|---|---|---|---|
| 3,862,726 | 1/1975 | Ulrich et al. ..................... | 242/107.4 |
| 3,865,329 | 2/1975 | Higbee et al. ..................... | 242/107.4 |
| 3,883,089 | 5/1975 | Close ............................ | 242/107.4 R |
| 4,036,322 | 7/1977 | Takada, deceased ........ | 242/107.4 B |
| 4,467,980 | 8/1984 | Fohl ............................. | 242/107.4 B |
| 4,565,338 | 1/1986 | Takada .......................... | 242/107.4 B |
| 5,232,177 | 8/1993 | Hibata .......................... | 242/107.4 B |
| 5,232,178 | 8/1993 | Hirata et al. .................. | 242/101.4 R |

FOREIGN PATENT DOCUMENTS 1280443 7/1972 United Kingdom .
2105972 4/1983 United Kingdom .
2221605 2/1990 United Kingdom .

Primary Examiner—Daniel P. Stodola
Assistant Examiner—John P. Darling
Attorney, Agent, or Firm—Sughrue, Mion, Zinn, Macpeak & Seas

[57] ABSTRACT

A seat belt retractor is provided with an emergency locking mechanism which can operate securely while an end lock state where a webbing can be neither drawn out nor taken up is prevented from being caused by the maloperation of the emergency locking mechanism at the time of storage of the belt. A rotation control disk having teeth which are equal in pitch circle diameter to teeth of a driving side gear rotating together with a takeup shaft but different in number from the teeth of the driving side gear is rotatably supported on a rotary shaft of the driving side gear. The rotation control disk is rotated by an intermediate gear with a phase shift relative to the driving side gear. The movement of the lock member is limited by a limiting member in accordance with an angle of phase shift of the rotation control disk relative to the takeup shaft so that the lock member cannot move in the direction of engagement with the latch member when the webbing is taken up substantially entirely.

8 Claims, 9 Drawing Sheets 5,388,780

SEAT BELT RETRACTOR

BACKGROUND OF THE INVENTION

The present invention relates to a seat belt retractor (takeup device) and particularly relates to an improvement in a seat belt retractor provided with an emergency locking mechanism.

Heretofore, a seat belt by which an occupant being in a car or the like is seated safely is constituted by a webbing, a buckle, fasteners and a retractor (takeup device).

The retractor is a device by which the webbing is retracted automatically to prevent the webbing from damaging when the seat belt is not used, and by which the effective length of the webbing is changed freely when the seat belt is used.

The retractors are classified into an automatic locking type retractor, an emergency locking type retractor, etc. To solve the problem that a sense of oppression is given to the occupant using such a seat belt because the occupant is restricted excessively, there is generally selected an emergency locking type retractor provided with an emergency locking mechanism in which the retractor is locked physically by an inertia sensing means responsive to sudden acceleration, collision or deceleration to thereby restrict the occupant effectively and safely and reduce the sense of oppression due to the webbing.

As the inertia sensing means used in the above-mentioned emergency locking type retractor, there is a sensing means for sensing the speed of drawing-out of the webbing. For example, the sensing means is formed so that a lock member connects a takeup shaft and a latch member to each other to rotate both the takeup shaft and the latch member in the direction of drawing-out of the webbing when a rotational lag is caused in an inertial member relative to the takeup shaft to thereby make a cam portion of the latch member act on a follower portion of a ratchet member to make the ratchet member engage with a ratchet wheel united with the takeup shaft to perform locking of the rotation of the takeup shaft in the direction of drawing-out of the webbing.

In the retractor having the above-mentioned constitution in which the rotation of the takeup shaft in the direction of drawing-out of the webbing is locked by using the inertial force of the inertial member, the rotation of the takeup shaft in the direction of drawing-out of the webbing may be locked unnecessarily in a state where the inertial force acts except a case of emergency. That is, when the webbing drawn out is taken up entirely suddenly in accordance with the spring force of a takeup spring, the lock member connects the takeup shaft and the latch member to each other because of the shock of sudden taking-up to thereby lock the rotation of the takeup shaft in the direction of drawing-out of the webbing. As a result, the takeup shaft cannot rotate in the direction of drawing-out of the webbing. At the same time, the takeup shaft can not rotate in the direction of taking-up of the webbing because the webbing is entirely taken up. Thereafter, the webbing substantially can be neither drawn out nor taken up except that the webbing can be drawn out or taken up in a narrow range between a state where the ratchet member is allowed to engage with the ratchet wheel and a state where the ratchet member actually engages with the ratchet wheel. There arises a problem that the retractor falls into a so-called end lock state.

SUMMARY OF THE INVENTION

An object of the present invention is therefore to solve the above-mentioned problem, that is, to provide a seat belt retractor provided with an emergency locking mechanism which can operate securely while an end lock state where the webbing can be neither drawn out nor taken up is prevented from being caused by the maloperation of the emergency locking mechanism at the time of storage of the belt.

The foregoing object of the present invention is achieved by a seat belt retractor provided with an emergency locking mechanism for locking the rotation of a takeup shaft in the direction of drawing-out of a webbing in case of emergency, which comprises: a base; a ratchet wheel mounted on the takeup shaft; an inertial member which rotates following the rotation of the takeup shaft; a ratchet member capable of engaging with the ratchet wheel; a latch member which rotates together with the takeup shaft in the direction of drawing-out of the webbing to thereby make the ratchet member engage with the ratchet wheel to lock the rotation of the takeup shaft in the direction of drawing-out of the webbing; a locking means for connecting the latch member to the takeup shaft in the case where a rotational lag occurs in the inertial member relative to the takeup shaft, the locking means including a lock member engaging with the latch member, and a flange fixed to the takeup shaft; a driving side gear integratedly rotating with the takeup shaft and being provided with teeth on its outer circumference; a rotation control disk provided with teeth which are equal in pitch circle diameter to the teeth of the driving side gear but different in number from the teeth of the driving side gear, the rotation control disk being rotatably supported on one and one and the same rotary shaft of the driving side gear; an intermediate gear axially supported so as to engage with the two kinds of teeth of the driving side gear and the rotation control disk simultaneously to thereby rotate the rotation control disk, with a phase shift relative to the driving side gear; and a limiting means for limiting the movement of the lock member in the direction of engagement with the latch member in accordance with an angle of the phase shift of the rotation control disk relative to the takeup shaft.

In the constitution of the present invention, the lock member is limited by the limiting means through sensing of the quantity of taking-up of the webbing so that the lock member cannot move in the direction of engagement with the latch member, when the webbing is taken up substantially entirely. Accordingly, a state where the webbing cannot be drawn out is prevented from being caused by the maloperation of the emergency locking mechanism at the time of storage of the belt.

DETAILED DESCRIPTION OF THE PREFERRED EMBODIMENT

A first embodiment of the present invention will be described below in detail with reference to the accompanying drawings.

Figure 1:
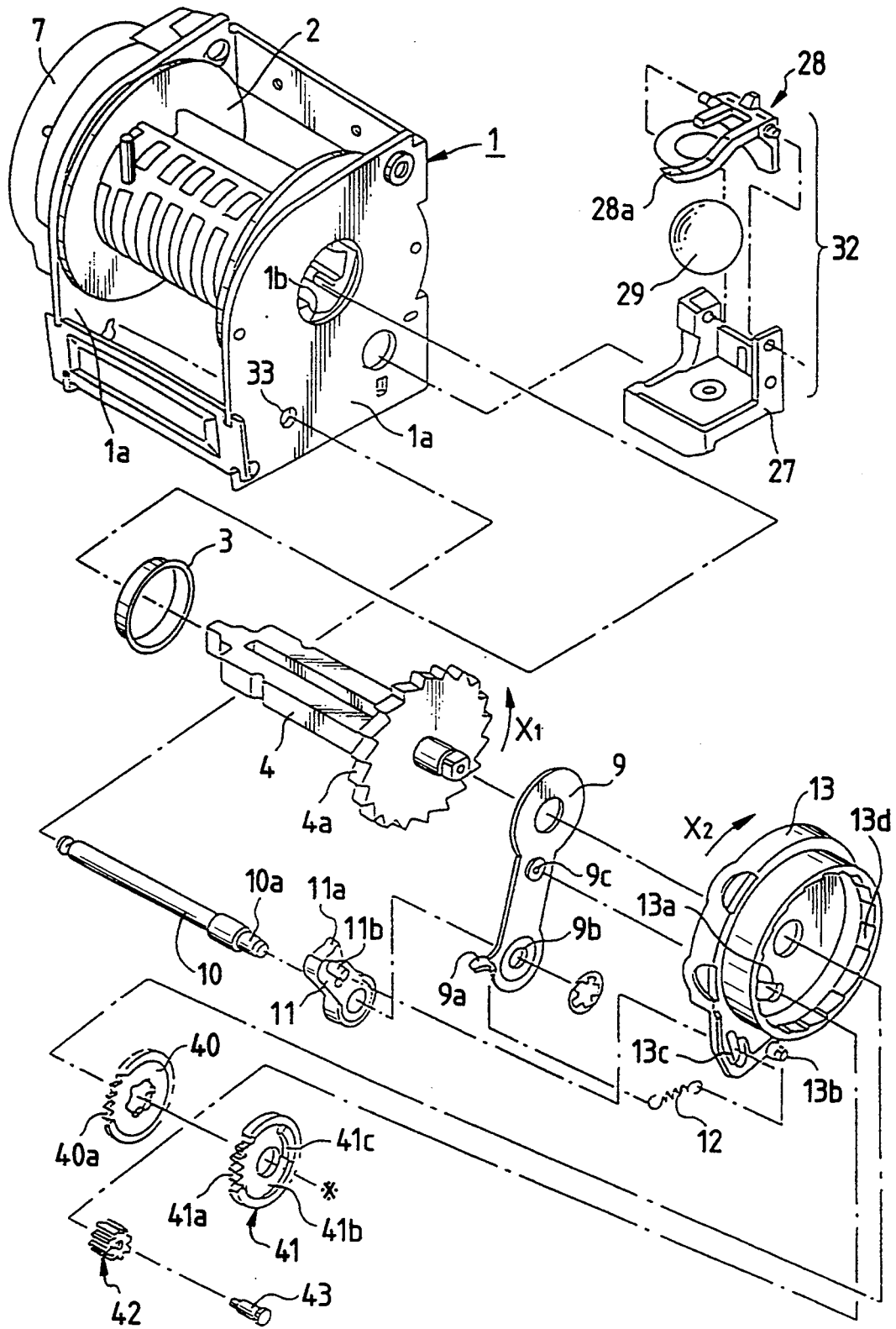
FIG. 1 is an exploded perspective view of a part of a seat belt retractor according to a first embodiment of the present invention.
Figure 2:
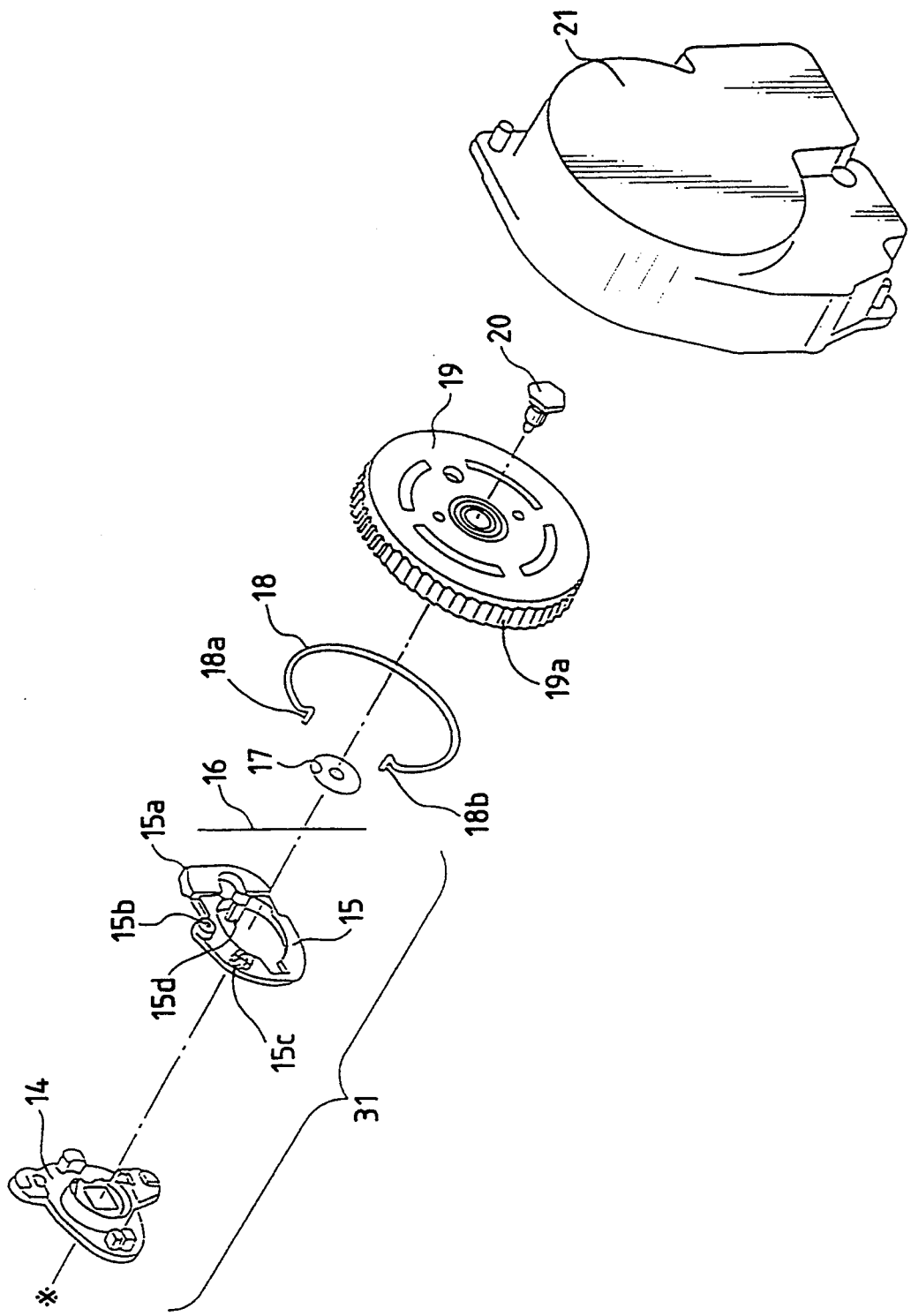
FIG. 2 is an exploded perspective view of the residual part of the seat belt retractor depicted in FIG. 1.
Figure 3:
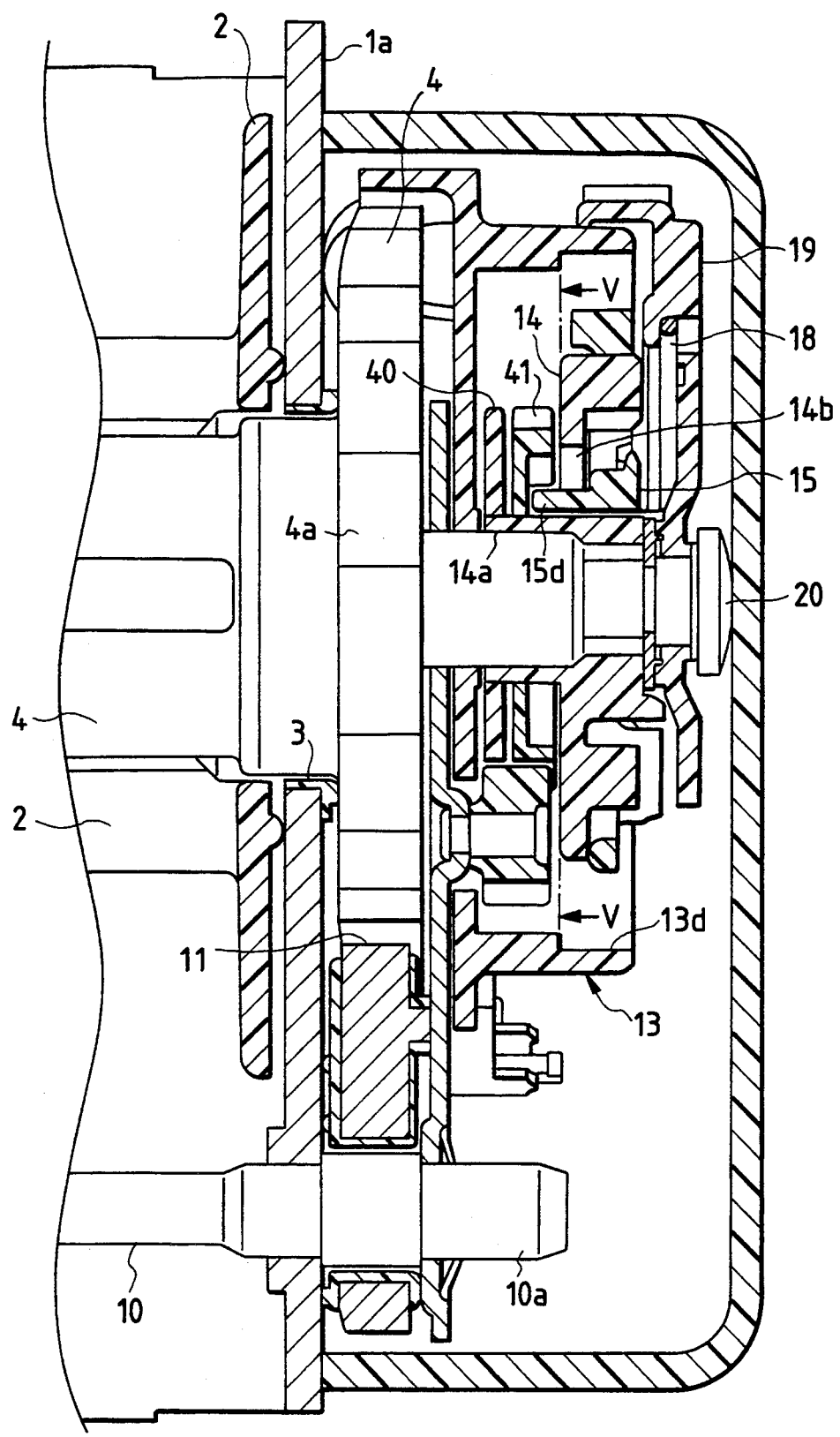
FIG. 3 is a sectional view of an important part of the seat belt retractor depicted in FIG. 1 and 2.

In exploded perspective views and a partly sectional view of a seat belt retractor shown in FIG. 1 through 3, a base 1 has as its large part a U-shaped section in which through-holes 1b are formed in opposite side plates 1a so as to be opposite to each other. A takeup reel 2 on which a webbing is to be wound is fitted to a takeup shaft 4, and the takeup shaft 4 is extended like a bridge between the side plates 1a so as to be rotatably fitted in the through-holes 1b through left and right plastic bushes 3. At one end of the takeup shaft 4, a known takeup spring device 7 is disposed to always urge the takeup shaft 4 in the direction of taking-up of the webbing.

At the other end of the takeup shaft 4, an emergency locking mechanism is disposed to prohibit drawing-out of the webbing in case of emergency. The emergency locking mechanism has a latch plate 4a fixed to the other end portion of the takeup shaft 4 so as to serve as a ratchet wheel. A part of the takeup shaft 4 projects out from the latch plate 4a. A tension plate 9 and a latch cup 13 serving as a latch member having internal teeth 13d are loosely fitted onto the projecting part of the takeup shaft 4. A return spring 12 is disposed between a spring hanger 13b formed on the latch cup 13 and another spring hanger 9a formed on the tension plate 9, so that force for urging the latch cup 13 to rotate in the direction of an arrow $X_2$ acts on the latch cup 13. A flange 14 which cooperates with a sensor spring 16 and a lock member 15 having a lock portion 15a engaged with the internal teeth 13d to thereby form a locking means 31 is fixed to the takeup shaft 4 at the outside of the latch cup 13 through a driving side gear 40 and a rotation control disk 41. Further, a ratchet wheel 19 which serves as an inertial member loosely fitted onto a tapping screw 20 spirally mounted on the flange 14 through a plane washer 17 is provided at the outside of the lock member 15. A plurality of teeth 19a which are oriented in the direction of drawing-out of the belt so as to be engaged with a sensor arm 28 of a body acceleration sensing means 32 which will be described later are formed on the outer circumferential surface of the ratchet wheel 19. Further, a friction spring 18 is slidably mounted on a mount portion provided in the inside of the ratchet wheel 19. The friction spring 18 is engaged with the lock member 15, so that the ratchet wheel 19 can move relative to the takeup shaft 4 while the ratchet wheel 19 rotates together with the takeup shaft 4.

The driving side gear 40 is fitted onto the top end of a boss portion 14a of the flange 14 and rotates together with the takeup shaft 4. The rotation control disk 41 which is rotatably loosely fitted onto the boss portion 14a of the flange 14 so as to overlap the driving side gear 40 has teeth 41a which are equal in pitch circle diameter to the teeth 40a of the driving side gear 40 but different in number from the teeth 40a of the driving side gear 40 and being formed on its outer circumference, and a circular recess 41b being formed in its side surface facing the flange 14. An intermediate gear 42 which is provided adjacently to the rotation control disk 41 and the driving side gear 40 so as to engage with the two kinds of teeth 40a and 41a simultaneously is rotatably supported by a pin 43 which passes through the latch cup 13 so that the top end portion of the pin 43 is fixed into a hole 9c of the tension plate 9. A long hole 13a is formed in the bottom of the latch cup 13 in order to prevent interference with the intermediate gear 42 at the time of rotation.

That is, assuming now that the number of teeth of the driving side gear 40 is 25 and the number of teeth of the rotation control disk 41 is 24 or 26 (in this embodiment, the number of teeth is 24 as shown in the accompanying drawings) which differs by one from the number of teeth of the driving side gear 40, then the rotation control disk 41 driven by the driving side gear 40 through the intermediate gear 42 rotates following the rotation of the driving side gear 40 with a phase shift by one tooth (360 degrees/24 teeth=15 degrees) relative to the driving side gear 40 per one revolution of the driving side gear 40. A gear having teeth which are equal in pitch circle diameter but different in number by one may be formed easily through a method of setting backlash, or the like.

Figure 5:
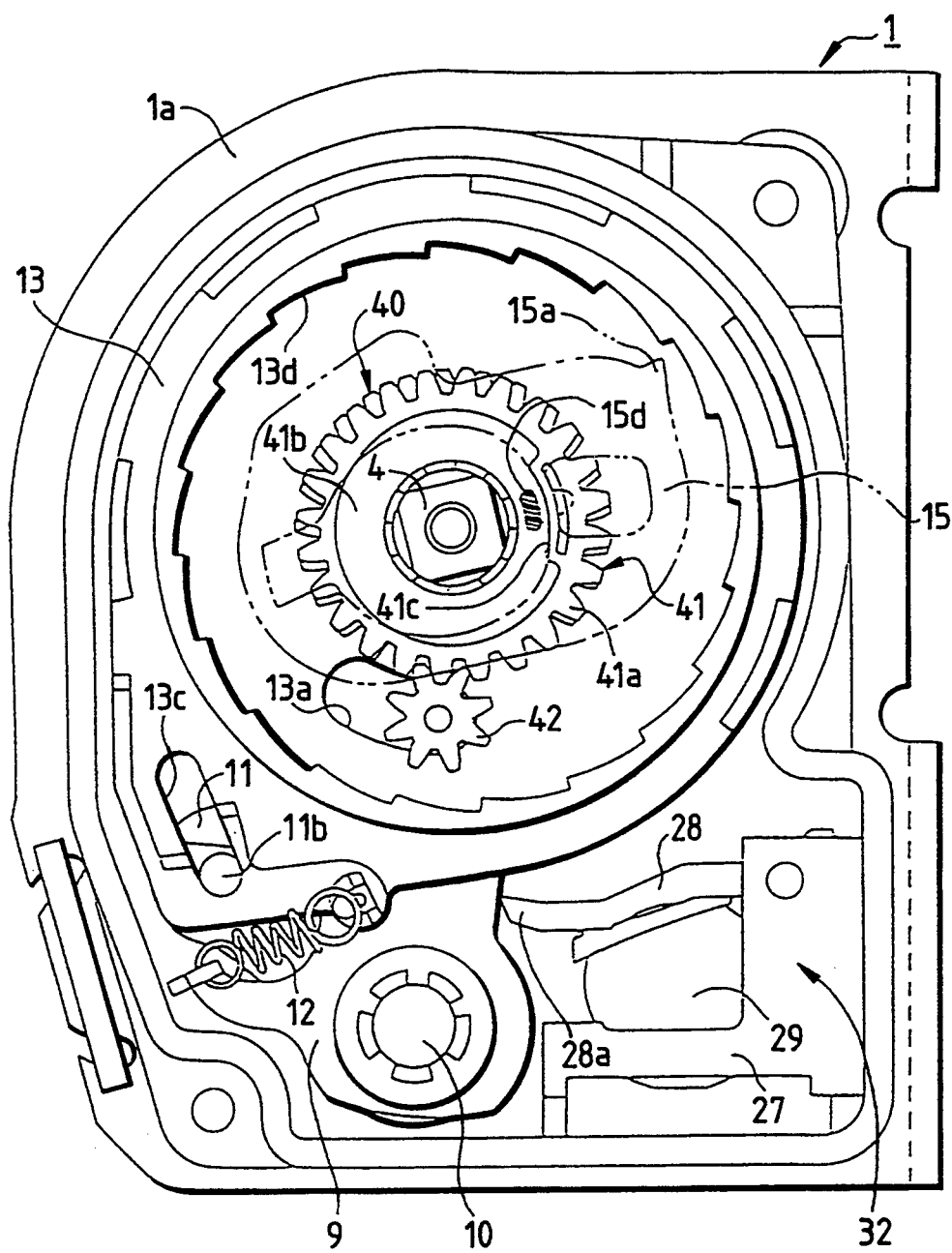
FIG. 5 is a partly sectional view taken along line V—V in FIG. 3 for explaining the operation of locking the drawing-out of the webbing.

Further, a stoppage wall 41c is formed in a part of the circumferential wall of the recess 41b of the rotation control disk 41 so as to project inwards and toward the rotary shaft. The stoppage wall 41c cooperates with a stoppage portion 15d which is erected from the lock member 15 so as to pass through a through-hole 14b provided in the flange 14 so that the stoppage portion 15d can engage with the stoppage wall 41c to thereby form a limiting means for limiting the movement of the lock member 15 in the direction of engagement with the internal teeth 13d of the latch cup 13. The rotation control disk 41 is installed in a set position so that the stoppage wall 41c and the stoppage portion 15d face each other at the time of entirely taking-up of the webbing as shown in FIG. 5. Accordingly, even in the case where the lock portion 15a of the lock member 15 is to move in the direction of engagement with the internal teeth 13d of the latch cup 13, the lock member 15 cannot engage with the latch cup 13 because the movement of the lock member 15 is limited by the stoppage portion 15d being in contact with the stoppage wall 41c.

Further, a pawl 11 which serves as a ratchet member engaged with the latch plate 4a to thereby prevent the rotation of the latch plate 4a in the direction of drawing-out of the webbing (the direction of an arrow $X_1$) is pivoted in the outside of a side plate 1a through a pawl pin 10 so as to be disengageable from the latch plate 4a. The pawl pin 10 is inserted into a through-hole 33 formed in the side plate 1a. A through-hole 9b formed in a fee end portion of the tension plate 9 is fitted onto a shaft portion 10a at an outer end side of the pawl pin 10. The pawl 11 therefore can rotate around the through-hole 33. Further, a pawl guide protrusion 11b is formed on the pawl 11. The pawl guide protrusion 11b is inserted into a pawl guide hole 13c which is formed in a projection formed on the outer circumferential portion of the latch cup 13.

Further, a sensor case 27 constituting a body acceleration sensing means 32 is fixed to the lower portion of the side plate 1a. A ball weight 29 which serves as a sensor is placed in a hollow portion of the sensor case 27. A sensor arm 28 having a protrusion 28a is swingably attached to the sensor case 27. Further, a sensor cover 21 is disposed in the outside of the side plate 1ato cover the emergency locking mechanism.

The operation of the seat belt retractor will be described below.

Figure 4:
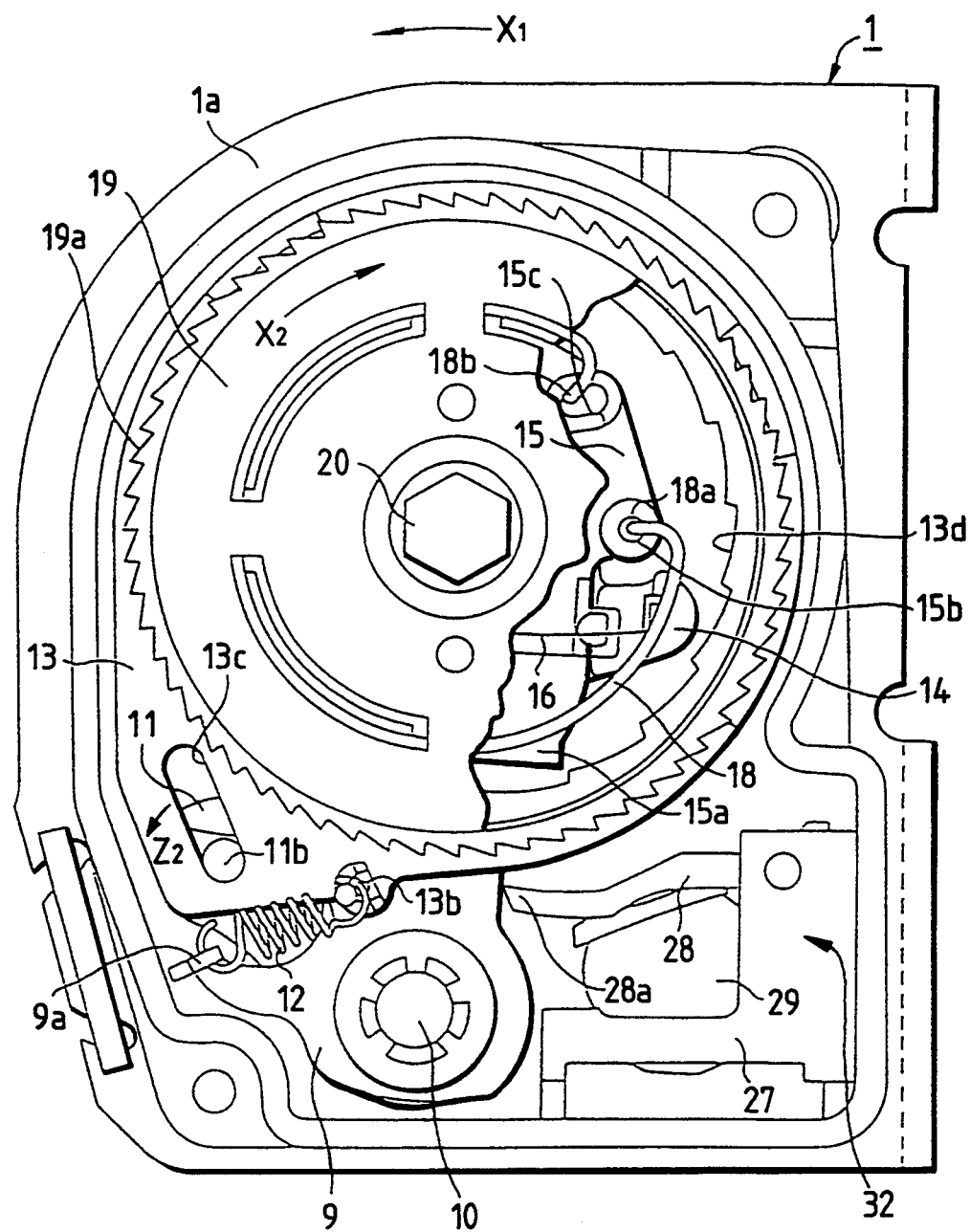
FIG. 4 is a partly cutaway side view for explaining the operation of locking the drawing-out of the webbing in the seat belt retractor depicted in FIGS. 1 and 2.

First, in a state of ordinary use, as shown in FIG. 4, the latch cup 13 is urged in the direction of taking-up of the webbing (the direction of the arrow $X_2$) by the urging force of the return spring 12 disposed between the spring hanger 13b and the spring hanger 9a of the tension plate 9; the pawl 11 having the pawl guide protrusion 11b engaged with the pawl guide hole 13c is urged in the direction of an arrow $Z_2$ so as to disengage from the latch plate 4a; and the lock portion 15a of the lock member 15 is urged by the urging force of the sensor spring 16 so as to disengage from the internal teeth 13d of the latch cup 13. Accordingly, the webbing can be drawn out freely.

Figure 7:
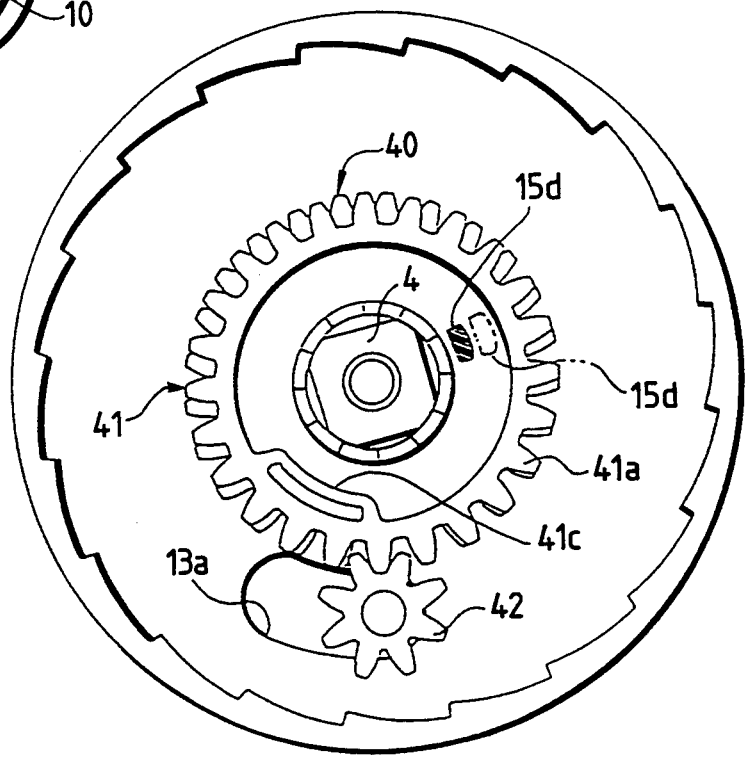
FIG. 7 is a partly enlarged view for explaining the operation of the rotation control disk depicted in FIG. 5.

As shown in FIG. 5, the rotation control disk 41 is installed in a set position so that the stoppage wall 41c and the stoppage portion 15d face each other when the webbing is taken up entirely. When the webbing is drawn out by a predetermined quantity from the retractor at the time of attachment of the belt so that the takeup shaft 4 rotates in the direction of drawing-out of the webbing, the stoppage wall 41c moves to a position so as not to face the stoppage portion 15d as shown in FIG. 7. That is, because the rotation control disk 41 is rotated by the driving side gear 40 rotating together with the takeup shaft 4 while the rotation control disk 41 rotates in advances by one tooth than the driving side gear 40 whenever the rotation control disk 41 makes one rotation, a phase shift by one tooth is caused in the rotation of the rotation of control disk 41 relative to the lock member 15 whenever the takeup shaft 4 makes one rotation. The takeup shaft 4 generally makes 8–15 rotations at the time of attachment of the belt, so that the stoppage wall 41c can be located in a position so as to thoroughly disengage from the stoppage portion 15d.

Accordingly, the lock portion 15a of the lock member 15 can move in the direction of engagement with the internal teeth 13d of the latch cup 13 without limitation of movement caused by engagement of the stoppage portion 15d with the stoppage wall 41c, so that the lock member 15 can engage with the latch cup 13.

When tension is imposed on the webbing not shown in case of emergency so that a larger rotation force than a predetermined value acts on the takeup shaft 4 in the direction of drawing-out of the webbing (the direction of the arrow $X_1$), the ratchet wheel 19 suffers inertial force so that a rotational lag occurs in the ratchet wheel 19 relative to the takeup shaft 4 in the direction of drawing-out of the webbing. When the force of the friction spring 18 mounted on the mount portion of the ratchet wheel 19, that is, the force of the engagement portion 18a of the friction spring 18 pressing a surface at the inside of the hole 15b of the lock member 15 in the direction of engagement of the lock portion 15a with the internal teeth 13d, is larger than the urging force of the sensor spring 16, the lock member 15 is moved in the direction of engagement of the lock portion 15a with the internal teeth 13d.

Figure 6:
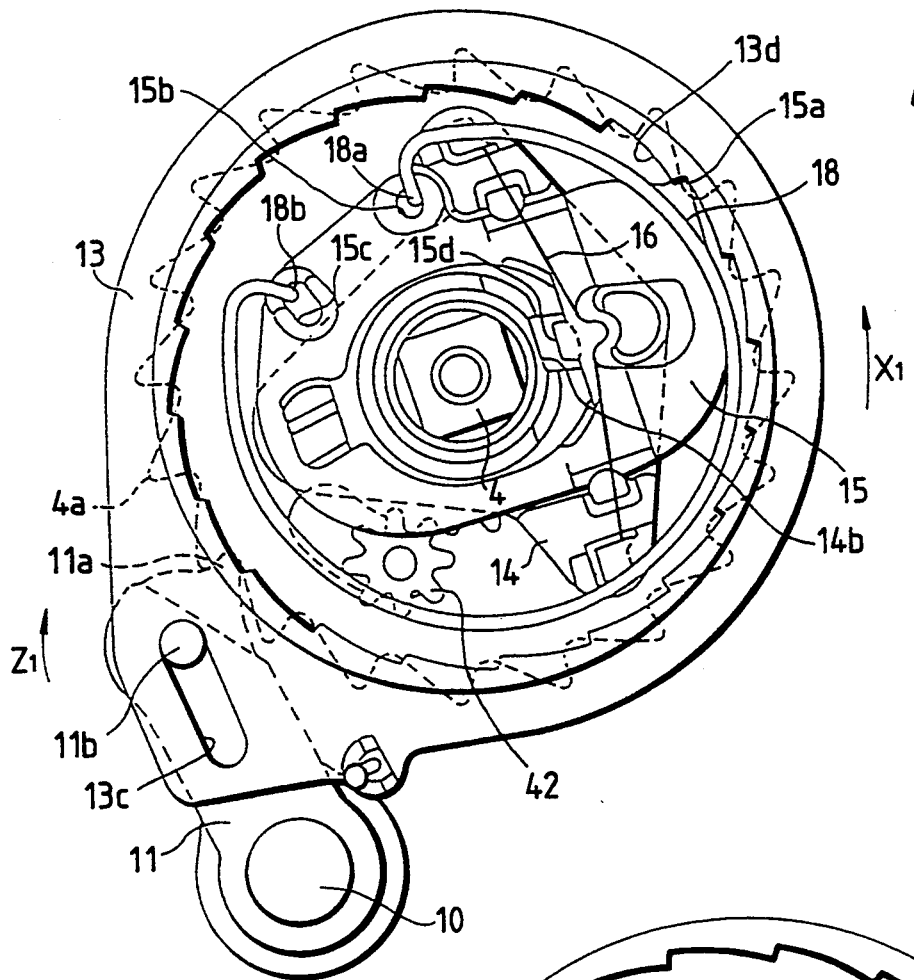
FIG. 6 is a partly enlarged view for explaining the operation of locking the drawing-out of the webbing in the seat belt retractor depicted in FIGS. 1 and 2.

When the takeup shaft 4 further rotates in the direction of drawing-out of the webbing, the lock portion 15a of the lock member 15 engages with the internal teeth 13d of the latch cup 13 so that the rotation force of the flange 14 is transmitted to the latch cup 13, as shown in FIG. 6. Thus, the latch cup 13 rotates in the direction of the arrow $X_1$ together with the takeup shaft 4 against the urging force of the return spring 12. Then, the pawl guide hole 13c engaged with the pawl guide protrusion 11b makes the pawl 11 rotate in the direction of the arrow $Z_1$ through the pawl guide protrusion 11b to thereby make the engagement portion 11a engage with the latch plate 4a. As a result, the pawl 11 suppresses and locks the rotation of the latch plate 4a in the direction of the arrow $X_1$, that is, the pawl 11 suppresses and locks the drawing-out of the webbing.

When a car suffers a larger speed change than a predetermined value in case of emergency, the ball weight 29 swings to move the sensor arm 28 so that the top end 28a of the sensor arm 28 engages with the teeth 19a of the ratchet wheel 19. As a result, the rotation of the ratchet wheel 19 in the direction of drawing-out of the belt is prohibited. When the webbing is further drawn out in a state in which the rotation of the ratchet wheel 19 in the direction of drawing-out of the belt is prohibited, a rotational lag occurs in the ratchet wheel 19 relative to the rotation of the takeup shaft 4 in the direction of drawing-out of the webbing. As a result, the locking means 31 operates so that the drawing-out of the webbing is locked as described above.

When the tension acting on the webbing is released, the latch cup 13 is rotated through the urging force of the return spring 12 in a direction reverse to the direction of the arrow $X_1$ to thereby rotate the pawl 11 in the direction of the arrow $Z_2$. As a result, the latch plate 4a is unlocked so that the webbing can be drawn out freely.

When the takeup shaft 4 further rotates from the webbing drawing-out state in the direction of taking-up of the webbing in accordance with the spring force of the spring device 7, the rotation control disk 41 rotates following the driving side gear 40 which rotates together with the takeup shaft 4 while the rotation control disk 41 rotates in advance by one tooth than the driving side gear 40 whenever the rotation control disk 41 makes one rotation. When the webbing is taken up entirely, the rotation control disk 41 returns to a position in which the stoppage wall 41c faces the stoppage portion 15d as shown in FIG. 5.

In the case where the lock portion 15a of the lock member 15 is to move in the direction of engagement with the internal teeth 13d of the latch cup 13 on the basis of the shock produced when the webbing drawn out is taken up suddenly entirely in accordance with the spring force of the takeup spring device 7, the lock member 15 cannot engage with the latch cup 13 because the stoppage portion 15d engages with the stoppage wall 41c to thereby limit the movement thereof. Accordingly, the rotation of the takeup shaft 4 in the direction of drawing-out of the webbing is not locked, so that the takeup shaft 4 does not fall into a so-called end lock state in which the webbing cannot be drawn out. Even in the case where the top end 28a of the sensor arm 28 is kept in a state of engagement with the teeth 19a of the ratchet wheel 19 by the shock of the suddenly entirely taking-up of the webbing, the engagement of the top end 28a with the teeth 19a can be released by slightly taking up the webbing after drawing out the webbing because the webbing can be drawn out while the stoppage wall 41c limits the movement of the stoppage portion 15d.

That is, the rotation control disk 41 senses the quantity of taking-up of the webbing so that the stoppage wall 41c is brought into contact with the stoppage portion 15d to limit the movement thereof so that the lock member 15 cannot move in the direction of engagement with the latch cup 13 when the webbing is taken up substantially entirely. Accordingly, an end lock state in which the webbing can be neither drawn out nor taken up is prevented from being caused by the maloperation of the emergency locking mechanism at the time of storage of the belt. Thus, a seat belt retractor provided with an emergency mechanism which can operate securely can be obtained.

It is a matter of course that the rotation control disk, the driving side gear, the intermediate gear, the locking means, etc. according to the present invention are not limited to the constitution of the above-mentioned embodiment and that various changes may be made.

It is also a matter of course that the limiting means for limiting the movement of the lock member in the direction of engagement with the latch member is not limited to the constitution of the above-mentioned embodiment in which the stoppage wall 41c of the rotation control disk 41 limits the lock member 15 directly.

FIG. 8 through 12 show an emergency locking mechanism based on second embodiment of the present invention using a limiting means and a locking means 50 according to another constitution. This embodiment has the same constitution as that of the first embodiment except that a combination of the rotation control disk 41, the flange 14 and the lock member 15 is replaced by a combination of a rotation control disk 45, a flange 47, a lever 48 and a lock member 49. The principle of the operation of the emergency locking mechanism in the second embodiment is the same as in the first embodiment, and the description thereof will be omitted.

Figure 8:
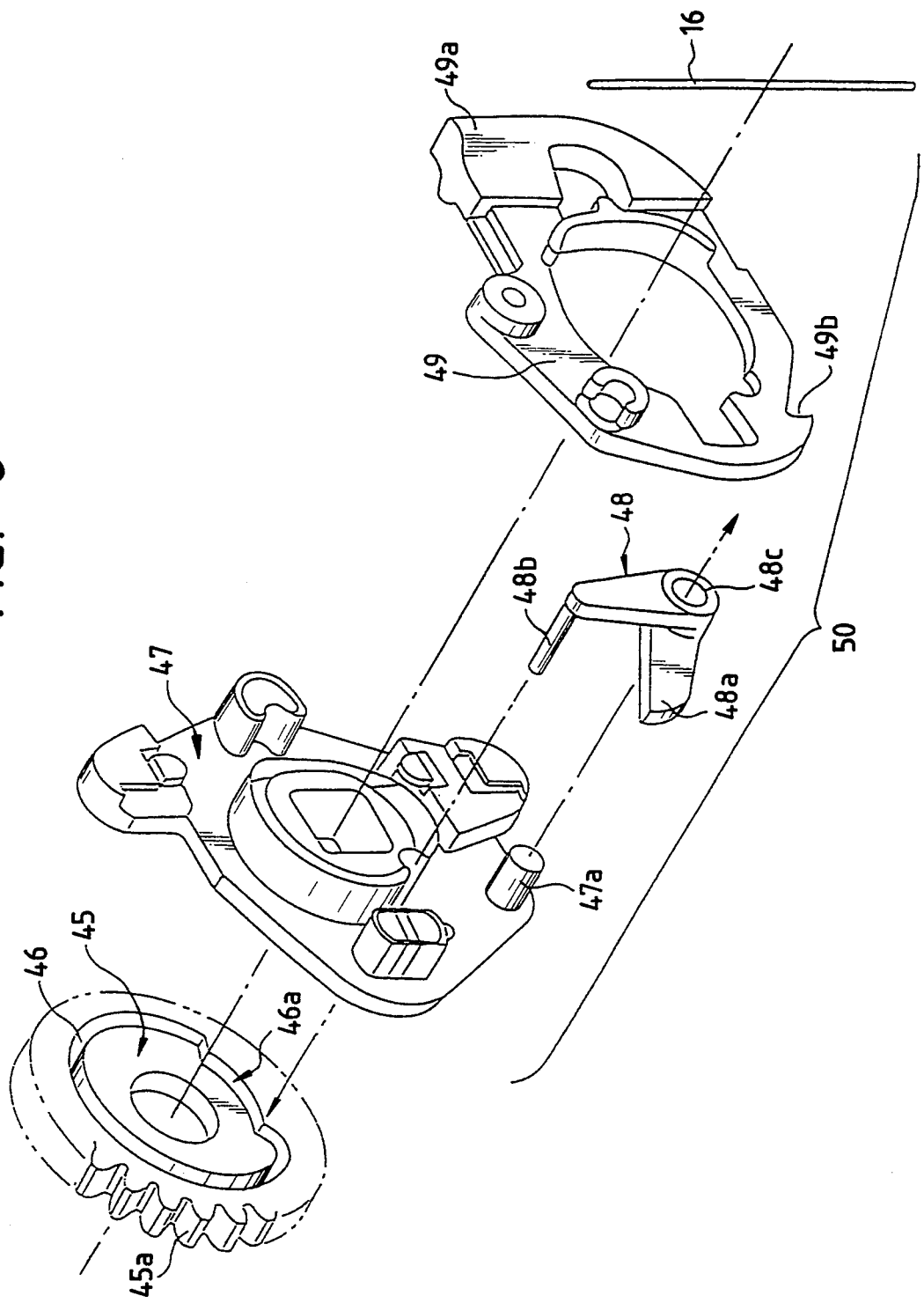
FIG. 8 is an exploded perspective view of the locking means provided with the limiting means according to a second embodiment of the present invention.

As shown in FIG. 8, the rotation control disk 45 which is rotatably disposed so as to overlap the driving side gear 40 has teeth 45a which are formed on its outer circumference thereof so that they are equal in pitch circle diameter to the teeth 40a of the driving side gear 40 but different in number from the teeth 40a of the driving side gear 40. Like the rotation control disk 41 in the first embodiment, the rotation control disk 45 rotates following the driving side gear 40 with a phase shift by one tooth relative to the driving side gear 40 whenever the driving side gear 40 makes one rotation.

A cam groove 46 substantially circularly shaped along the circumference of the rotation control disk 45 is formed in a side surface of the rotation control disk 45 so as to face the flange 47. An inward cam groove region 46a which is bent so as to extend inwards and toward the rotary shaft is formed in a part of the cam groove 46. The inward cam groove 46a, the lever 48 rotatably supported by a pivot 47a provided on the flange 47, and a stoppage portion 49b formed on the lock member 49 constitute a limiting means for limiting the movement of the lock member 49 in the direction of engagement with the internal teeth 13d of the latch cup 13.

Figure 9:
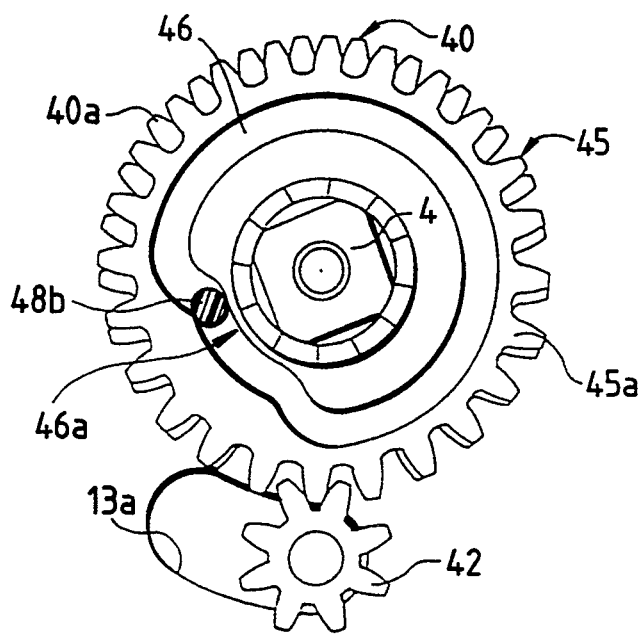
FIG. 9 is a partly enlarged view for explaining the operation of the rotation control disk depicted in FIG. 8.
Figure 10:
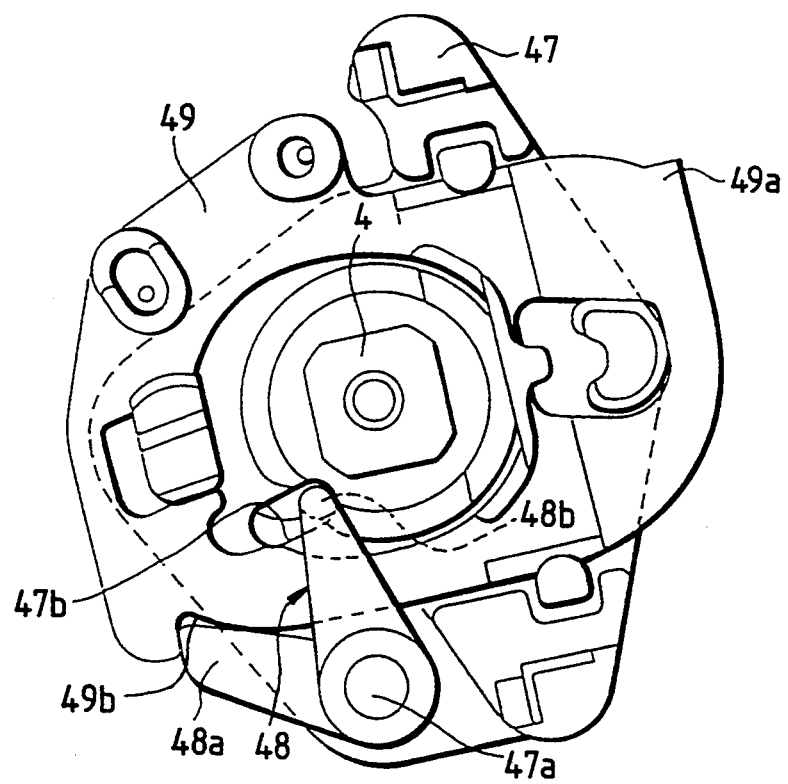
FIG. 10 is a partly enlarged view for explaining the operation of the locking means depicted in FIG. 8.

The lever 48 has a stoppage arm 48a capable of engaging with the stoppage portion 49b of the lock member 49, and a follower protruding portion 48b which passes through a though-hole 47b provided in the flange 47 so as to engage with the cam groove 46. The rotation control disk 45 is installed in a set position so that the follower protruding portion 48b of the lever 48 is placed in the inward cam groove region 46a and that the stoppage arm 48a engages with the stoppage portion 49b as shown in FIGS. 9 and 10 when the webbing is taken up entirely. Accordingly, in the case where the lock portion 49a of the lock member 49 is to move in the direction of engagement with the internal teeth 13d of the latch cup 13, the lock member 49 cannot engage with the latch cup 13 because the stoppage portion 49b comes in contact with the stoppage arm 48a to thereby limit the movement of the lock member 49. As a result, the emergency locking mechanism cannot operate.

Figure 11:
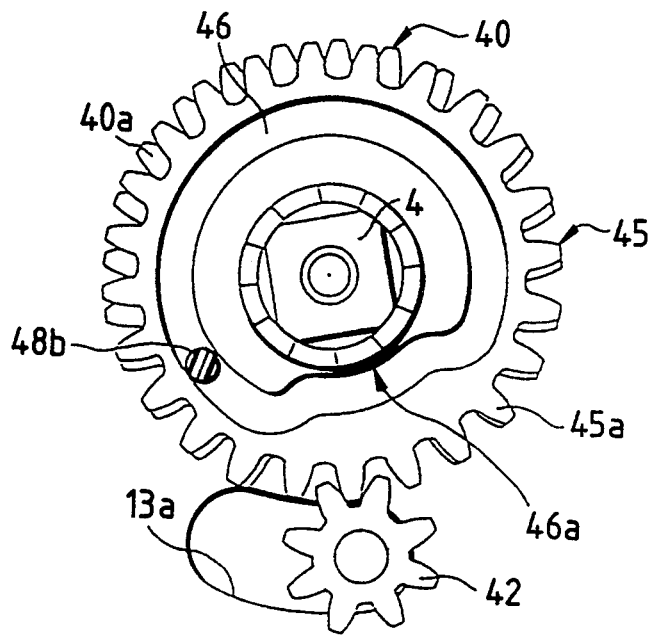
FIG. 11 is a partly enlarged view for explaining the operation of the rotation control disk depicted in FIG. 8.
Figure 12:
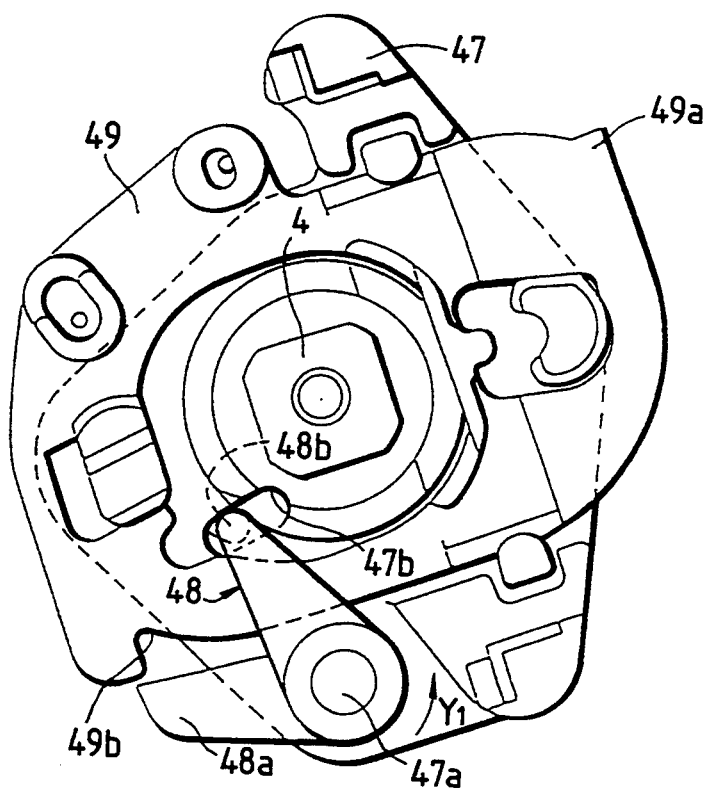
FIG. 12 is a partly enlarged view for explaining the operation of the locking means depicted in FIG. 8.

When the webbing is drawn out by a predetermined quantity from the retractor at the time of attachment of the seat belt so that the takeup shaft 4 rotates in the direction of drawing-out of the webbing, the rotation control disk 45 is rotated so that the follower protruding portion 48b of the lever 48 is moved to a position of the cam groove 46 away from the inward cam groove region 46a of the rotation control disk 45 as shown in FIG. 11. That is, the rotation control disk 45 is rotated by the driving side gear 40 rotating together with the takeup shaft 4 while the rotation control disk 45 rotates in advance by one tooth than the driving side gear 40 whenever the rotation control disk 45 makes one rotation. Accordingly, a phase shift by one tooth is caused in the rotation control disk 45 relative to the flange 47 whenever the takeup shaft 4 makes one rotation. At the time of attachment of the belt, the takeup shaft 4 generally makes 8-15 rotations in the direction of drawing-out of the webbing. Accordingly, the follower protruding portion 48b can be securely placed in a position of the cam groove 46 away from the inward cam groove region 46a. Therefore, as shown in FIG. 12, the lever 48 is rotated in the direction of the arrow $Y_1$ so that the stoppage arm 48a moves to a position so as to disengage from the stoppage portion 49b.

Accordingly, the lock portion 49a of the lock member 49 can move in the direction of engagement with the internal teeth 13d of the latch cup 13 without limitation of the movement of the lock member 49 by the stoppage portion 49b coming in contact with the stoppage arm 48a. Accordingly, the lock member 49 can engage with the latch cup 13, so that the emergency locking mechanism is enabled to operate.

When the takeup shaft 4 further rotates from the webbing drawing-out state in the direction of taking-up of the webbing in accordance with the spring force of the takeup spring device 7, the rotation control disk 45 is rotated by the driving side gear 40 rotating together with the takeup shaft 4 while the rotation control disk 45 rotates in advance by one tooth than the driving side gear 40 whenever the rotation control disk 45 makes one rotation. At the time of entirely taking-up of the webbing, the follower protruding portion 48b returns to the inward cam groove region 46a as shown in FIG. 9.

That is, the rotation control disk 45 senses the quantity of taking-up of the webbing so that the stoppage portion 49b is brought into contact with the stoppage arm 48a to limit the movement thereof so that the lock member 49 cannot move in the direction of engagement with the latch cup 13 when the webbing is taken up substantially entirely. Accordingly, an end lock state in which the webbing can be neither drawn out nor taken up is prevented from being caused by the maloperation of the emergency locking mechanism at the time of storage of the belt, in the same manner as in the first embodiment. Thus, a seat belt retractor provided with an emergency mechanism which can operate securely can be obtained.

That is, according to the present invention, the limiting means for limiting the movement of the lock member in the direction of engagement with the latch member operates in accordance with an angle of phase shifting of the rotation control disk relative to the takeup shaft, so that the quantity of taking-up of the webbing can be sensed. Therefore, the lock member can be limited so that the lock member cannot move in the direction of engagement with the latch member when the webbing is taken up entirely. Accordingly, a state in which the webbing cannot be drawn out is prevented from being caused by the maloperation of the emergency locking mechanism at the time of storage of the belt.

Accordingly, there can be provided a seat belt retractor provided with an emergency locking mechanism which can operate securely while an end lock state in which the webbing can be neither drawn out nor taken up is prevented from being caused by the maloperation of the emergency locking mechanism at the time of storage of the belt.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the at to utilize the invention in various embodiments and with various modifications as are suited to the particular use contemplated. It is intended that the scope of the invention be defined by the claims appended hereto, and their equivalents.

What is claimed is:

1. A seat belt retractor provided with an emergency locking mechanism for locking the rotation of a takeup shaft in the direction of drawing-out of a webbing in case of emergency, which comprises:
    a base;
    a ratchet wheel mounted on said takeup shaft;
    an inertial member which rotates following the rotation of said takeup shaft;
    a ratchet member capable of engaging with said ratchet wheel;
    a latch member which rotates together with said takeup shaft in the direction of drawing-out of said webbing to thereby make said ratchet member engage with said ratchet wheel to lock the rotation of said takeup shaft in the direction of drawing-out of said webbing;
    a locking means for connecting said latch member to said takeup shaft in the case where a rotational lag occurs in said inertial member relative to said takeup shaft, said locking means including a lock member engaging with said latch member, and a flange fixed to said takeup shaft;
    a driving side gear fixedly rotating with said takeup shaft along a rotary shaft and being provided with teeth on its outer circumference;
    a rotation control disk provided with teeth, which are equal in pitch circle diameter to the teeth of said driving side gear but different in number from the teeth of said driving side gear, said rotation control disk being rotatably supported on the rotary shaft of said driving side gear;
    an intermediate gear axially supported so as to engage with the two kinds of teeth of the driving side gear and said rotation control disk simultaneously to thereby rotate said rotation control disk with a phase shift relative to said driving side gear; and
    a limiting means for limiting the movement of said lock member in the direction of engagement with said latch member in accordance with an angle of the phase shift of said rotation control disk relative to said takeup shaft.

2. A seat belt retractor according to claim 1, wherein said limiting means is set so that the movement of said lock member in the direction of engagement with said latch member is limited when said webbing is taken up entirely.

3. A seat belt retractor according to claim 2, wherein:
    said rotation control disk includes a circular recess formed in a side surface of said rotation disk facing said flange so as to be rotatably loosely fitted onto a boss portion of said flange, and a stoppage wall formed at a part of the circumferential wall of said recess so as to extend inwards and toward the rotary shaft; and
    said lock member includes a stoppage portion provided so as to be capable of engaging with said stoppage wall of said rotation control disk.

4. A seat belt retractor according to claim 3, wherein said limiting means is constituted by said stoppage portion of said lock member and said stoppage wall of said rotation control disk and is set so that said stoppage wall and said stoppage portion are positioned so as to face each other when said webbing is taken up entirely to thereby limit the movement of said lock member in the direction of engagement with said latch member.

5. A seat belt retractor according to claim 1, in which said limiting means further comprising:
    a lever rotatably supported by a pivot provided on said flange.

6. A seat belt retractor according to claim 5, wherein said limiting means is set so that the movement of said lock member in the direction of engagement with said latch member is limited when said webbing is taken up entirely.

7. A seat belt retractor according to claim 6, wherein:
    said rotation control disk includes a cam groove which is rotatably loosely fitted onto a boss portion of said flange and which is formed in a side surface of said control disk facing said flange substantially circularly along the circumference of said rotation control disk, and an inward cam groove region provided as a part of said cam groove and bent so as to extend inwards and toward the rotary shaft;

said lever includes a stoppage arm capable of engaging with said lock member, and a follower protruding portion which passes through a through-hole provided in said flange and engages with said cam groove; and said lock member includes a stoppage portion capable of engaging with said stoppage arm of said lever.

8. A seat belt retractor according to claim 7, wherein said limiting means is constituted by said stoppage portion of said lock member, said inward cam groove region of said rotation control disk and said lever including said stoppage arm and said follower protruding portion, and is set so that said follower protruding portion of said lever is positioned in said inward cam groove region and that said stoppage arm is positioned so as to engage with said stoppage portion when said webbing is taken up entirely to thereby limit the movement of said lock member in the direction of engagement with said latch member.

* * * * *